US009011593B2

(12) United States Patent
Gane et al.

(10) Patent No.: US 9,011,593 B2
(45) Date of Patent: Apr. 21, 2015

(54) PROCESS FOR THE MANUFACTURE OF SELF-BINDING PIGMENTARY PARTICLES, DRY OR IN AQUEOUS SUSPENSION OR DISPERSION, CONTAINING INORGANIC MATTER AND BINDERS

(75) Inventors: Patrick Gane, Studenweg (CH); Joachim Schoelkopf, Buechbühlstrasse (CH)

(73) Assignee: Omya International AG, Oftringen (CH)

( * ) Notice: Subject to any disclaimer, the term of this patent is extended or adjusted under 35 U.S.C. 154(b) by 854 days.

(21) Appl. No.: 11/629,580

(22) PCT Filed: Jul. 12, 2005

(86) PCT No.: PCT/IB2005/002762
§ 371 (c)(1),
(2), (4) Date: Jan. 3, 2007

(87) PCT Pub. No.: WO2006/008657
PCT Pub. Date: Jan. 26, 2006

(65) Prior Publication Data
US 2007/0266898 A1    Nov. 22, 2007

(30) Foreign Application Priority Data
Jul. 13, 2004  (FR) ...................................... 04 07806

(51) Int. Cl.
*C04B 14/28* (2006.01)
*C09C 1/36* (2006.01)
*C09C 1/02* (2006.01)
*C09C 3/04* (2006.01)
*C09C 3/00* (2006.01)
*C09C 3/08* (2006.01)

(52) U.S. Cl.
CPC ................. *C09C 3/045* (2013.01); *C09C 1/021* (2013.01); *C09C 3/006* (2013.01); *C09C 3/08* (2013.01); *C01P 2002/88* (2013.01); *C01P 2004/51* (2013.01); *C01P 2004/62* (2013.01)

(58) Field of Classification Search
CPC ............. C01P 2002/88; C01P 2004/51; C01P 2004/62; C09C 1/021; C09C 3/006; C09C 3/045; C09C 3/08
USPC .......... 106/436, 400, 401, 463, 464, 471, 484
See application file for complete search history.

(56) References Cited

U.S. PATENT DOCUMENTS

| 4,243,430 A | 1/1981 | Sperry et al. |
| 4,369,272 A * | 1/1983 | Jaffe ............................... 524/88 |

(Continued)

FOREIGN PATENT DOCUMENTS

| CN | 1072935 A | 6/1993 |
| DE | WO 03/074786 | * 12/2003 ............. D21H 17/69 |

(Continued)

OTHER PUBLICATIONS

Office Action dated Sep. 25, 2012 for Japanese Application No. 2007-520923.

*Primary Examiner* — Carlos Barcena
(74) *Attorney, Agent, or Firm* — Amster, Rothstein & Ebenstein LLP

(57) ABSTRACT

The present invention is directed to a process for the preparation of an aqueous suspension of self-binding pigmentary particles comprising the following stages: (a) forming one or more aqueous suspensions of at least one inorganic matter comprising calcium carbonate; (b) forming or obtaining one or more aqueous solutions or suspensions or emulsions of at least one binder; and (c) co-grinding the aqueous suspension or suspensions obtained in stage a) with the aqueous solutions or suspensions or emulsions obtained in stage b) in a mill so as to obtain an aqueous suspension of self-binding pigmentary particles.

31 Claims, 2 Drawing Sheets

(56) References Cited

U.S. PATENT DOCUMENTS

| | | | |
|---|---|---|---|
| 5,318,624 A | 6/1994 | Corbin | |
| 5,455,312 A | 10/1995 | Heidingsfeld et al. | |
| 5,833,747 A * | 11/1998 | Bleakley et al. | 106/464 |
| 6,180,690 B1 | 1/2001 | Spinelli | |
| 2004/0131961 A1 * | 7/2004 | Watanabe et al. | 430/108.4 |
| 2004/0250970 A1 | 12/2004 | Qiu et al. | |
| 2005/0119419 A1 * | 6/2005 | Blanchard et al. | 525/331.9 |
| 2007/0249758 A1 * | 10/2007 | Suau et al. | 523/334 |

FOREIGN PATENT DOCUMENTS

| | | | | |
|---|---|---|---|---|
| EP | 1 167 475 A2 | | 1/2002 | |
| FR | 2 818 165 A1 | | 12/2000 | |
| JP | 54054145 A | | 4/1979 | |
| JP | 54129031 A | | 10/1979 | |
| JP | 60086174 A | | 5/1985 | |
| JP | 62169870 A | | 7/1987 | |
| JP | 5320533 A | | 12/1993 | |
| JP | 6073323 A | | 3/1994 | |
| JP | 8006049 B | | 1/1996 | |
| JP | 2000144030 A | | 5/2000 | |
| JP | 2001271007 A | | 10/2001 | |
| JP | 2002146260 A | | 5/2002 | |
| JP | 2003082024 A | | 3/2003 | |
| WO | 9311183 A1 | | 6/1993 | |
| WO | 0100712 A1 | | 1/2001 | |
| WO | WO 02-49766 | * | 6/2002 | B02C 23/06 |
| WO | WO 03/066692 | * | 8/2003 | C08F 220/12 |
| WO | WO 03/074786 A3 | | 9/2003 | |
| WO | WO 2004/041882 A1 | | 5/2004 | |

* cited by examiner

PROCESS FOR THE MANUFACTURE OF SELF-BINDING PIGMENTARY PARTICLES, DRY OR IN AQUEOUS SUSPENSION OR DISPERSION, CONTAINING INORGANIC MATTER AND BINDERS

This is a U.S. national phase of PCT Application No. PCT/IB2005/002762, filed Jul. 12, 2005 and claims priority to French Application No. 04/07806, filed Jul. 13, 2004.

BACKGROUND OF THE INVENTION

The invention concerns a process for the manufacture of self-binding pigmentary particles, dry or in aqueous suspension or dispersion, containing at least one inorganic matter and at least one binder.

Inorganic particles and the polymer binders are two of the essential components used in the manufacture of various coatings; the inorganic particles, generally calcium carbonate, contribute to the final product certain properties such as optical properties, and the binders, generally in the form of latex suspensions or dispersions, give an overall cohesion to all the constituent elements used in the process to manufacture coating compositions.

However, it has been known for many years that complex interactions may occur between the calcium carbonate and all the forms of binders, causing the final properties of the coating products to be modified. For example, "Physical and chemical modifications in latex binders and their effect on the coating colour rheology" (Advanced Coating Fundamentals Symposium, San Diego, Calif., United States, May 4-5, 2001, pp. 108-123) concerns the influence of the physical and chemical modifications in a dispersion of styrene-butadiene binders on the rheological properties of a wet pigmentary coating composition.

For a long time the production of self-binding pigmentary particles has been sought: solid particles containing a polymeric binder and an inorganic pigment which act as a single material, thus preventing the end user from losing specifications due to undesirable interactions in various applications.

It was initially advanced that such self-binding pigments differ from the well-known pigmentary granulates through the nature of the forces assuring cohesion of these composite particles.

For example, document WO 01/00712 presents dry pigmentary granulates comprising 5% to 99% by weight of organic polymer pigment, from 0% to 94.5% by weight of inorganic pigment and from 0.5% to 5% by weight of a binder or mixture of binders.

Such granulates are manufactured by mixing all the constituents in dispersion and by drying by spraying of the said dispersion.

In addition, document WO 01/00713 describes plastic polymer pigments, applicable in a dry form, which can be hollow or solid, containing a polymer, a binder and an inorganic pigment.

As the inventors mention themselves, the conglomerates obtained consist of individual spherical particles bound together by electrostatic forces.

According to a different viewpoint, the concept of self-binding pigments must be considered in this document as mutually bound individual particles, in which the binding mechanisms use not only electrostatic forces but also chemical bindings created through sorption chemistry mechanisms, or physical bindings such as acid-base interactions between the inorganic matter and the polymeric binders and Lifhshitz/van der Waals interactions.

In accordance with this concept, document WO 93/11183 describes a process to prepare stable aqueous dispersions by forming two aqueous suspensions of inorganic matter and polymeric latex particles, by adjusting the Zeta potential of the suspensions, and finally by mixing the two suspensions. The Zeta potential may be modified through the use of an additive allowing the surface charge to be adjusted. The polymeric latex binder is supposed to be adsorbed strongly on the inorganic matter particles.

In addition, document WO 93/12183 teaches a process for the preparation of aqueous dispersions of composite particles comprising a latex and an inorganic matter, used in paints and coatings. The said polymeric latex particles act as a binder, contributing the necessary spacing between the inorganic particles to give the end product opacity and the brightness. The process is characterized in that the latex prepared by polymerisation in emulsion is mixed in an aqueous suspension of inorganic matter, which suspension of inorganic matter is pre-dispersed with poly(meth)acrylic acid or its salts, or copolymer polyelectrolytes of (meth)acrylic acid or its salts. The authors suppose that the dispersant of the pigment does not cover the entire surface of the inorganic matter, and that at least one portion of the said surface is available for the adsorption of the polymeric latex particles.

Finally, document U.S. Pat. No. 4,025,483 describes a process to increase the stability of titanium dioxide aqueous suspensions, by mixing the latter with polymeric latex particles. According to the examples, the polymeric latex particles increase the effectiveness of the dispersing agent which is contained in the initial inorganic matter suspension.

In the light of the prior art, the pigment-polymer particles can be obtained according to various processes which always make reference to the use of a third constituent, such as a dispersing agent or an additive allowing the surface charge to be adjusted, to formulate the initial aqueous suspensions which contain the inorganic matter on the one hand, and the polymeric compounds on the other, and which are later mixed. Introducing a third constituent may have the result of modifying drastically the end properties of the coating in which the pigment-polymer particles are incorporated.

SUMMARY OF THE INVENTION

In the present invention a process has been discovered in a surprising manner for the preparation of self-binding pigmentary particles, dry or in aqueous suspension or dispersion, containing at least one inorganic matter and at least one polymeric binder, using a ball mill.

Firstly, this process is different from the simple mixing described in document WO 03/74786.

Secondly, the process according to the invention spares the skilled man in the art from using a third constituent during the preparation of the aqueous suspensions containing the inorganic matter and the binders, and during the co-grinding stage.

In addition, and in a surprising manner, the binders do not adhere and do not block the mill, such that soiling of the equipment may be satisfactorily controlled.

Finally, another object of the invention resides in the self-binding pigmentary particles in the dry form obtained by the process according to the invention, containing at least one inorganic matter and at least one binder.

The term binder used in the present application refers to any natural or synthetic product of an organic nature, having binding properties. These binding properties, which increase the inter-particle cohesion forces of the initial mineral, are determined according to the method described in example 1 of the present application.

DETAILED DESCRIPTION OF THE INVENTION

Figure 1:
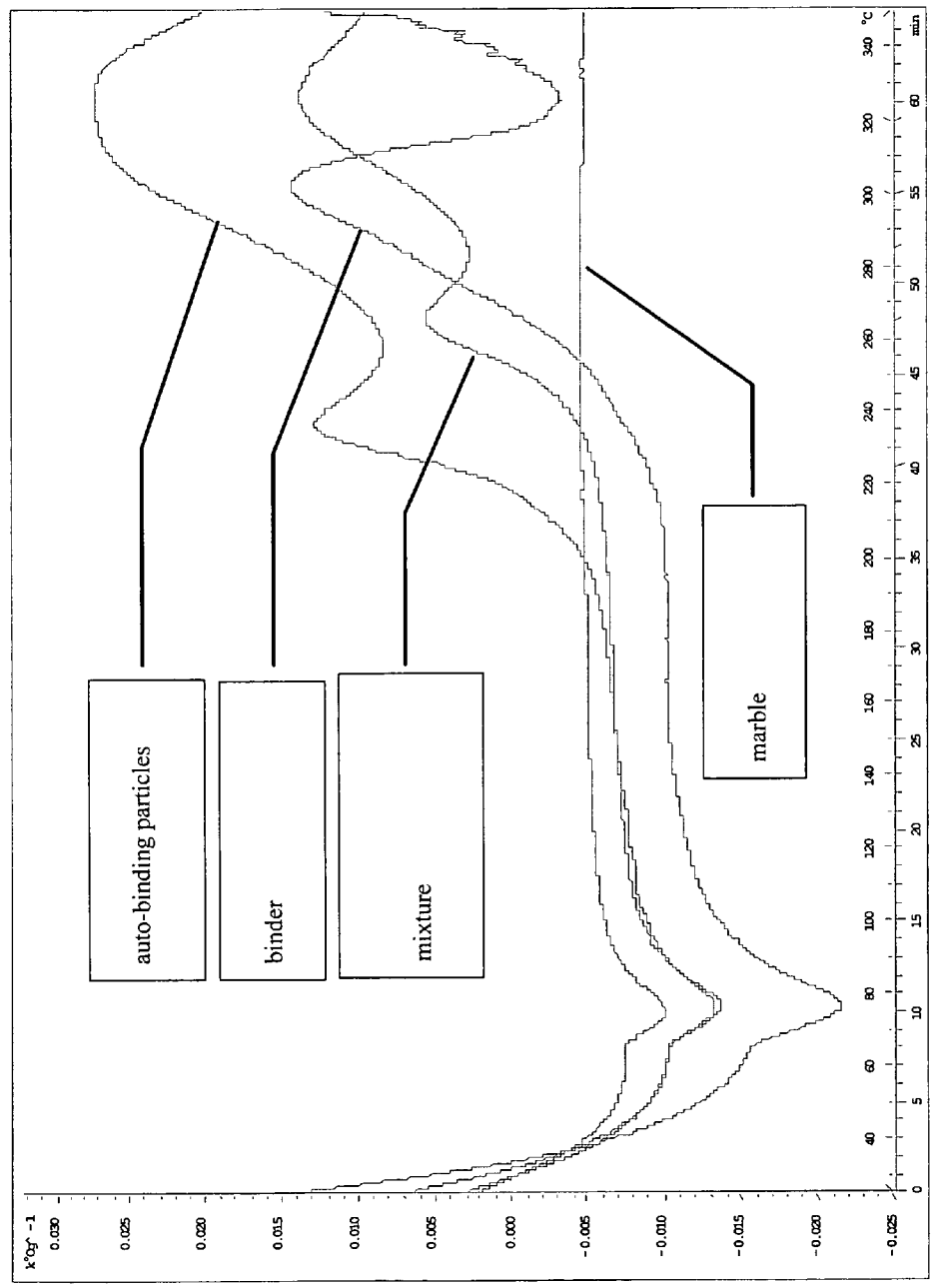
FIG. 1 illustrates the difference between the mineral-self-binding pigmentary particles binder pair according to the invention, and a simple mineral binder mixture.

According to the object of the invention, the process for the preparation of self-binding pigmentary particles, dry or in aqueous suspension or dispersion, comprises the following stages:
  a) forming one or more aqueous suspensions of at least one inorganic matter and introducing it or them into a mill with a view to stage c),
  b) forming or taking one or more aqueous solutions or suspensions or emulsions of at least one binder and introducing it or them into a mill with a view to stage c),
  c) co-grinding the aqueous suspension or suspensions obtained in stage a) with the aqueous solutions or suspensions or emulsions obtained in stage b) so as to obtain an aqueous suspension of self-binding pigmentary particles,
  d) possibly co-grinding the aqueous suspension obtained in stage c) with one or more aqueous solutions or suspensions or emulsions of at least one binder,
  e) possibly drying the aqueous suspension obtained in stage c) or in stage d).

According to the invention, the aqueous suspension formed in stage a) is characterized in that it contains from 1% to 80% by dry weight of inorganic matter, and more preferentially from 15% to 60% by dry weight of inorganic matter.

The aqueous suspension formed in stage a) may contain one or more inorganic matter, notably metal oxides, hydroxides, sulphites, silicates and carbonates, such as calcium carbonate, dolomites, kaolin, talc, gypsum, titanium dioxide, satin white or aluminium trihydroxide and their mixtures. Preferentially it contains calcium carbonate, in a natural form or precipitated form, and more preferentially natural calcium carbonate, and very preferentially a natural calcium carbonate chosen from among chalk, marble, calcite or their mixtures.

According to the invention, the aqueous solution(s) or suspension(s) or emulsion(s) formed in stage b) are characterized in that they contain from 1% to 50% by weight of at least one binder, and more preferentially from 5% to 20% by weight of at least one binder.

The aqueous solution(s) or suspension(s) or emulsion(s) formed in stage b) are also characterized in that the binder is chosen from among the semi-crystalline latexes, and preferentially from among the emulsions of polyethylene waxes or copolymers in their neutralised polyethylene form with other monomer units such as acrylic acid or other monomers or their mixtures, or from among the latexes in emulsion or solutions of soluble binders such as polyvinylic alcohol, polyvinyl acetate, starch, casein, proteins, carboxymethyl cellulose (CMC), ethyl hydroxyethyl cellulose (EHEC) or others, or their mixtures.

According to this variant, the semi-crystalline latexes are preferentially chosen from among the emulsions of polyethylene wax or the copolymers in their neutralised polyethylene form with other monomer units such as acrylic acid or other monomers or their mixtures, and the latexes in emulsion are preferentially chosen from among the copolymers of acrylic esters.

According to stage c) of the process according to the invention, the aqueous suspension(s) obtained in stage a) and the aqueous solution(s) or suspension(s) or emulsion(s) obtained in stage b) are then co-ground in order to obtain an aqueous suspension of self-binding pigmentary particles comprising at least one inorganic matter and at least one binder.

According to stage d) of the process according to the invention, the aqueous suspension of self-binding pigmentary particles obtained in stage c) is then co-ground with one or more aqueous solution(s) or suspension(s) or emulsion(s) comprising at least one binder.

The Applicant has been able to observe that the binders adsorb to the surface of the mineral matter, thus creating chemical and physical bonds characteristic of self-binding particles, without having to use a dispersing agent or a third additive, as is illustrated by the figures of the different examples.

The co-grinding process is undertaken by all the techniques well known to the skilled man in the art.

According to the invention, the aqueous suspension obtained in stage c) or in stage d) is characterized in that the ratio between the inorganic matter and the binders contained in the suspension obtained is between 99 and 1 expressed as weight proportions, and preferentially between 70 and 30 expressed as weight proportions.

Preferentially, the composition of the said aqueous suspension is between 5% and 80% by weight of inorganic matter, between 1% and 30% by weight of binders, and between 19% and 94% by weight of water. More preferentially, the said aqueous suspension contains between 20% and 40% by weight of inorganic matter, between 5% and 20% by weight of binders, and between 40% and 75% by weight of water.

In addition, according to a variant of the process according to the invention, a preferential form of the aqueous suspension formed in stage c) or in stage d) is characterized in that the self-binding pigmentary particles have an average particle diameter of between 0.1 μm and 10 μm, and preferentially between 0.1 μm and 2 μm, measured using a MasterSizer™ S granulometer sold by the company MALVERN.

This aqueous suspension or dispersion obtained in stage c) of the process according to the invention is self-binding, as is shown by example 1.

A possible variation of the process according the invention is characterized in that, after stage c) or possibly stage d), the two stages:
  f) Increasing the concentration of the aqueous suspension obtained at stage c) or d) through thermal or mechanical concentration;
  g) Dispersing the aqueous suspension obtained at stage f) through using at least one dispersing agent and/or at least one wetting agent.

According to this variant, the said dispersing agent or agents are selected from among the acrylic or vinylic or allyl polymers and/or copolymers, such as for example homopolymers or copolymers, in their totally acid or partially neutralised or totally neutralised form, using neutralisation agents containing monovalent or polyvalent cations or amines or their mixtures, of at least one of the monomers such as the acrylic and/or methacrylic, itaconic, crotonic, fumaric acids, maleic or isocrotonic acid, aconitic, mesaconic, sinapic, undecylenic anhydrides, angelic acid, and/or their respective esters, such as the acrylates and methacrylates of alkyl, of aryl, of alkylaryl, of arylalkyl and in particular ethyl acrylate, butyl acrylate, methyl methcrylate, acrylamido methyl propane sulphonic acid, acrylamide and/or methacrylamide, acrylate phosphate of glycol ethylene, methacrylate phosphate of glycol ethylene, acrylate phosphate of glycol propylene acrylate, methacrylate phosphate of glycol propylene, methacrylamido propyl trimethyl ammonium chloride or sulphate, ethyl chloride or ammonium trimethyl methacrylate sulphate, together with their acrylate and acrylamide counterparts, whether or not quaternised, and/or dimethyldiallyl chloride, vinylpyrrolidone, vinylcaprolactame, diisobutylene, vinyl acetate, styrene, alpha-methyl-styrene, sodium sulfonate styrene, vinylmethylether, and allylamine.

This or these dispersing agents can also be chosen from among at least one of the said monomers or their mixtures, polymerised in the presence of at least one mineral matter.

In addition, it should be noted that the optimisation of the molecular weight of this or these dispersing agents depends on their chemical nature.

In addition, the said aqueous dispersion of self-binding pigmentary particles contains between 0.01% and 2% by weight of dispersing agents.

According to this variant, the aqueous dispersion of self-binding pigmentary particles contains between 0.01% and 5% by weight of wetting agents.

In a final stage e) of the process according to the invention, the aqueous suspension or dispersion obtained in stage c) or in stage d) may be dried, so as to obtain self-binding pigmentary particles in a dry form, containing at least one inorganic matter and at least one binder, and possibly at least one dispersing agent and at least one wetting agent.

This stage is accomplished by all known drying methods, and preferentially by a method of drying by spraying in a diluted medium.

In the process according to the invention, the result of stage e) consists in self-binding pigmentary particles in a dry form, containing at least one inorganic matter and at least one binder, characterized in that they contain between 70% and 97.5% by weight of inorganic matter, and between 2.5% and 30% by weight of binders, and more preferentially between 85% and 95% by weight of inorganic matter and between 5% and 15% by weight of binders.

In addition, in a variant and according to a preferred form, the average diameter of the said self-binding pigmentary particles is between 5 µm and 100 µm, and more preferentially between 10 µm and 30 µm, measured using a MasterSizer™ S granulometer sold by the company MALVERN.

The invention is now illustrated through examples which cannot limit its scope.

Example 1

This example concerns the process for preparing self-binding pigmentary particles in an aqueous suspension from marble and two suspensions of binders.

To accomplish this, the first stage a) of the process consists in forming an aqueous suspension of 1000 grams by dry weight of marble having an average particle diameter of 0.8 µm by putting the marble into suspension in water at a dry matter content by weight equal to 20%.

Stage b) of the process is this accomplished by diluting an aqueous suspension of binder Acronal™ S728 sold by the company BASF up to a dry matter content by weight equal to 20%.

Stage c) is accomplished by the successive introduction of the marble suspension and the binder suspension in a mill of the Dyno-Mill™ type with a fixed cylinder, a rotating pulser, the grinding body of which consists in glass balls with a diameter of between 1.0 mm and 1.4 mm.

After 16 minutes' grinding, stage d) is continued through the addition into the mill of a second aqueous suspension of binder obtained by dilution, up to a dry matter content by weight equal to 20% of Polygen™ WE4 sold by the company BASF.

The total volume occupied by the grinding body is equal to 460 cm$^3$ while its weight is equal to 820 g.

The grinding chamber has a volume of 600 cm$^3$

The circumferential speed of the mill is 10 m·s$^{-1}$.

The calcium carbonate suspension is recycled at a rate of 33 liters/hour.

The temperature during each grinding test is maintained at approximately 25° C.

On conclusion of the grinding (85 minutes) a sample of the obtained suspension of self-binding pigmentary particles is removed in a flask. The granulometry of the suspension is measured using a MasterSizer™ S granulometer sold by the company MALVERN™ and is such that 85% of the particles have an average diameter of less than or equal to 1 µm.

The product thus obtained is an aqueous suspension of self-binding pigmentary particles having a dry matter by weight content of calcium carbonate equal to 20%, an average particle diameter equal to 0.5 µm measured using a MasterSizer™ S granulometer, and a marble/Acronal™ S728/Polygen™ WE4 ratio equal to 100/9.5/0.5 by dry matter weight proportions.

In this example, the illustration of the difference between the mineral-self-binding pigmentary particles binder pair on the one hand, and for a simple mixture on the other hand, is illustrated using a differential thermal analysis machine (ATD) TGA/SDTA 851e, sold by the company METTLER TOLEDO™. The heating conditions being: a rise in temperature of 5° C. per minute, from 25 C to 350° C.

In comparison, the same measurements were made on the pure products (marble and binder).

FIG. 1 illustrates the difference between the mineral-self-binding pigmentary particles binder pair according to the invention, and a simple mineral-binder mixture.

To demonstrate the suitability for the self-binding character of the pigmentary particles thus obtained, tablets were formulated using a membrane filtration process.

A machine of the high-pressure filter press type is used, manufactured from a hollow steel tube. The said tube is closed at the top by a lid and contains the filtration membrane at the bottom.

A volume of 80 ml is then introduced of either a suspension containing only the inorganic matter (which is used to manufacture the reference samples), or of a suspension according to the invention (which is used to manufacture the samples for testing).

A constant pressure of 15 bar is then applied, which enables the water to be eliminated, until a tablet 20 mm thick is obtained.

The samples are then dried in free air for 1 week.

The device and method used are described in detail in the document "Modified calcium carbonate coatings with rapid absorption and extensive liquid update capacity" (Colloids and Surfaces A, 236 (1-3), 2003, pp. 91-102).

The quasi-cylindrical solid blocks of pigmentary particles were ground using a disk mill (Jean Wirtz, Phoenix 4000) in the form of disk-shaped samples of diameter 25 mm and of approximate thickness 15 mm. The procedure is described in the document "Fluid transport into porous coating structures: some novel findings" (Tappi Journal, 83 (5), 2000, pp. 77-78).

The samples obtained underwent a crush resistance test on a Zwick-Roell tension machine with a WN158988 control unit, using a rod/flat system (with a hemispherical end). The force of the cell is 20 kN.

Figure 2:
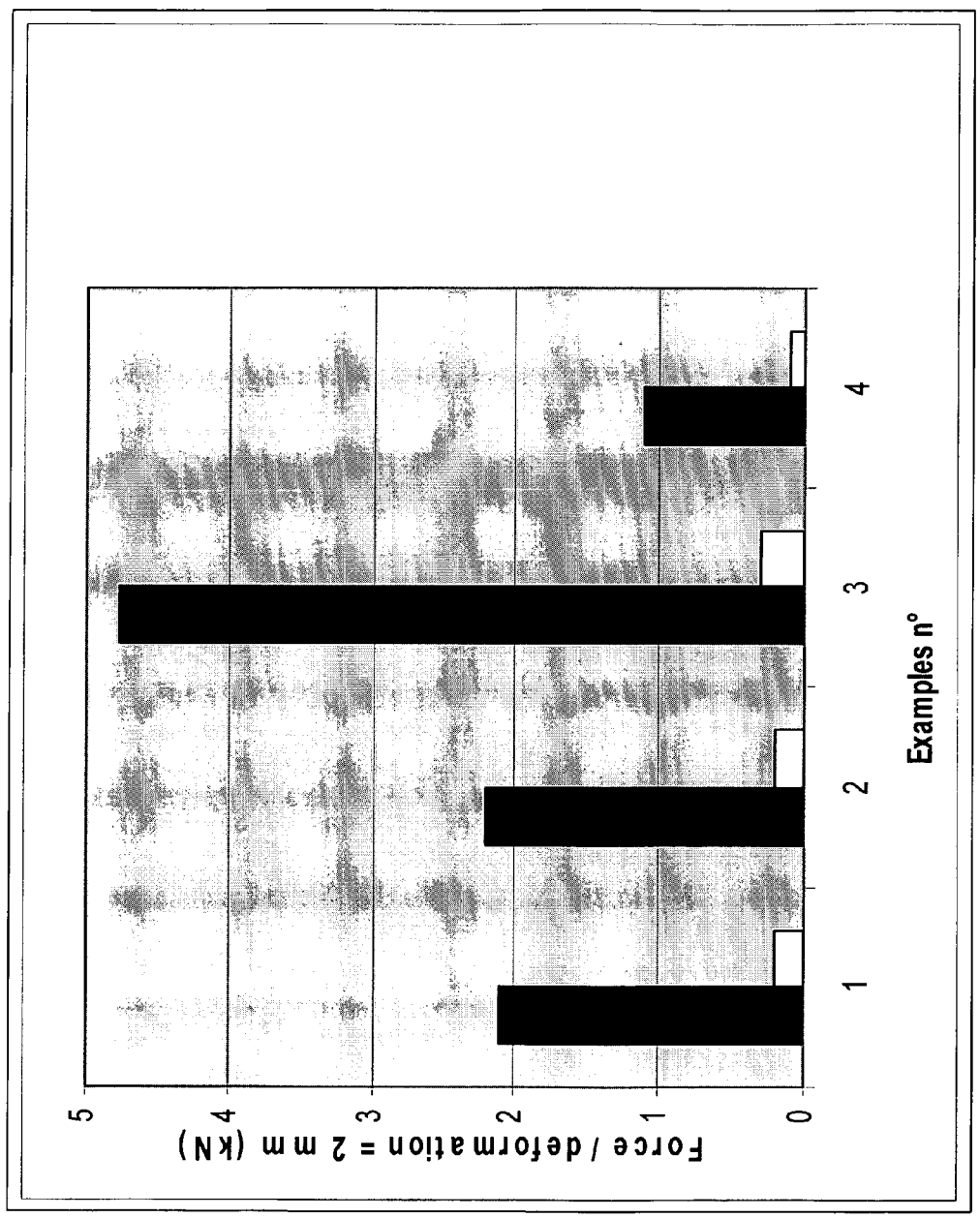
FIG. 2 illustrates the self-binding power for the self-binding pigmentary particles according to the invention: measurement of the force in the crush test for a 2 mm deformation for (1) samples of a suspension of self-binding pigmentary particles according to the invention (shaded bar), and (2) samples formulated according to the method in examples 1-4 from an aqueous suspension containing only the mineral matter used in the invention (unshaded bar).

The samples are crushed at a speed of 3 mm·min$^{-1}$ over a length of 10 mm. The values of the force for a deformation of 2 mm are illustrated in FIG. 2 for this example and the following examples. FIG. 2 illustrates the self-binding power for the self-binding pigmentary particles according to the invention: measurement of the force in the crush test for a 2 mm deformation for:

- samples of a suspension of self-binding pigmentary particles according to the invention,
- samples formulated according to the method described in example 1 from an aqueous suspension containing only the mineral matter used in the invention (2).

FIG. 2 shows clearly that the process according to the invention enables self-binding pigmentary particles to be obtained in which the inter-particular cohesive forces between the mineral particles are much higher than in the case of the initial mineral matter. This phenomenon is observed for example 1, but also for examples 2 to 4 which will be described subsequently.

Tables 1 and 1 bis indicate the granulometric distribution of the particles according to the invention, and of the initial mineral particles.

TABLE 1 granulometric distribution as measured using a MasterSizer ™ S granulometer sold by the company MALVERN ™ in the case of the suspension of self-binding pigmentary particles obtained using the process according to the invention (1), using a Sedigraph ™ 5100 sold by the company MICROMERITICS in the case of a suspension of initial inorganic matter (2).

| Size of particles (μm) | Quantity of particles by volume (%) (1) | Quantity of particles by volume (%) (2) |
|---|---|---|
| <71 | 100 | 100 |
| <45 | 100 | 100 |
| <25 | 100 | 100 |
| <10 | 100 | 99 |
| <5 | 100 | 96 |
| <2 | 98 | 84 |
| <1 | 85 | 59 |
| <0.7 | 71 | |
| <0.5 | 52 | 24 |
| <0.2 | 4 | 6 |
| <0.1 | 0 | 1 |

TABLE 1 bis value of the parameters $D_{50}$ (%) and $D_{90}$ (%) (diameter measurements for which respectively 50% and 90% by volume of the particles having a diameter of less than or equal to this value) for:
the self-binding pigmentary particles obtained using the process according to the invention (1)
the initial inorganic matter (2)

| | 1 | 2 |
|---|---|---|
| $D_{50}$ (%) | 0.48 | 0.85 |
| $D_{90}$ (%) | 1.21 | — |

Tables 1 and 1 bis demonstrate a notable reduction of the particle sizes, in the case of the self-binding pigmentary particles obtained according to the invention, relative to the initial inorganic matter.

Example 2

This example concerns the process for preparing self-binding pigmentary particles in an aqueous suspension from marble and from a styrene-butadiene binder.

To accomplish this, the first stage a) of the process consists in forming an aqueous suspension of marble having an average particle diameter of 0.85 μm by putting the marble into suspension in water at a dry matter content by weight equal to 20%.

For the second stage b) of the process, an aqueous suspension of binder DL 966 of DOW CHEMICALS is used at a content by weight of 50%.

Stage c) of the process is then undertaken by co-grinding the marble suspension obtained in stage a) with the suspension of binder obtained in stage b) with the same equipment as that used in example 1.

TABLE 2 granulometric distribution as measured using a MasterSizer ™ S granulometer sold by the company MALVERN ™ in the case of the suspension of self-binding pigmentary particles obtained using the process according to the invention (1), using a Sedigraph ™ 5100 sold by the company MICROMERITICS in the case of a suspension of initial inorganic matter (2)

| Size of particles (μm) | Quantity of particles by volume (%) (1) | Quantity of particles by volume (%) (2) |
|---|---|---|
| <71 | 100 | 100 |
| <45 | 100 | 100 |
| <25 | 100 | 100 |
| <10 | 100 | 99 |
| <5 | 100 | 96 |
| <2 | 98 | 84 |
| <1 | 75 | 59 |
| <0.7 | 54 | |
| <0.5 | 35 | 24 |
| <0.2 | 5 | 6 |
| <0.1 | 1 | 1 |

On conclusion of the grinding (30 minutes) a sample of the obtained suspension of self-binding pigmentary particles is removed in a flask. The granulometry of the suspension is measured using a MasterSizer™ S granulometer sold by the company MALVERN™ and is such that 75% of the particles have an average diameter of less than or equal to 1 μm.

The product thus obtained is an aqueous suspension of self-binding pigmentary particles having a dry matter by weight content of calcium carbonate equal to 21%, an average particle diameter equal to 0.65 μm measured using a MasterSizer™ S granulometer sold by the company MALVERN™ and a calcium carbonate/binder ratio equal to 100/10 by weight proportions.

The binding power of the said particles was measured by a crush test according to the method described in example 1, and is illustrated in FIG. 2. The latter shows that the process according to the invention enables self-binding pigmentary particles to be obtained in which the inter-particular cohesive forces between the mineral particles are much higher than in the case of the initial mineral matter.

Tables 2 and 2 bis indicate the granulometric distribution of the particles according to the invention, and of the initial mineral particles.

TABLE 2 bis value of the parameters $D_{50}$ (%) and $D_{90}$ (%) (diameter measurements for which respectively 50% and 90% by volume of the particles having a diameter of less than or equal to this value) for:
the self-binding pigmentary particles obtained using the process according to the invention (1)
the initial inorganic matter (2)

|  | 1 | 2 |
|---|---|---|
| $D_{50}$ (%) | 0.65 | 0.85 |
| $D_{90}$ (%) | 2.00 |  |

Tables 2 and 2 bis demonstrate a notable reduction of the particle sizes, in the case of the self-binding pigmentary particles obtained according to the invention, relative to the initial inorganic matter.

Example 3

This example concerns the process for preparing self-binding pigmentary particles in an aqueous suspension from precipitated calcium carbonate (PCC) and two suspensions of binders.

To accomplish this, the first stage a) of the process consists in forming an aqueous suspension of precipitated calcium carbonate having an average diameter of 1.8 μm by putting the precipitated calcium carbonate into suspension in water at a dry matter content by weight equal to 20%.

For the second stage b) of the process, use is made of a first aqueous suspension of Acronal™ S728 binder sold by the company BASF at a dry matter content by weight equal to 20%, and a second aqueous suspension of Polygen™ WE4 binder sold by the company BASF at a dry matter content by weight equal to 20%.

The three suspensions are then co-ground with the same equipment as that of example 1.

On conclusion of the grinding (30 minutes) a sample of the obtained suspension of self-binding pigmentary particles is removed in a flask. The granulometry of the suspension is measured using a MasterSizer™ S granulometer sold by the company MALVERN™ and is such that 83% of the particles have an average diameter of less than or equal to 1 μm.

The product thus obtained is an aqueous suspension of self-binding pigmentary particles having a dry matter by weight content of precipitated calcium carbonate equal to 20%, an average particle diameter equal to 0.53 μm measured using a MasterSizer™ S granulometer sold by the company MALVERN™ and a PCC/Acronal™ S728/Polygen™ WE4 ratio equal to 100/9.5/0.5 by dry matter weight proportions.

The binding power of the said particles was measured by a crush test according to the method described in example 1, and is illustrated in FIG. 2. The latter shows that the process according to the invention enables self-binding pigmentary particles to be obtained in which the inter-particular cohesive forces between the mineral particles are much higher than in the case of the initial mineral matter.

Tables 3 and 3 bis indicate the granulometric distribution of the particles according to the invention, and of the initial mineral particles.

TABLE 3 granulometric distribution as measured using a MasterSizer ™ S granulometer sold by the company MALVERN ™ in the case of the suspension of self-binding pigmentary particles obtained using the process according to the invention (1), using a Sedigraph ™ 5100 sold by the company MICROMERITICS in the case of a suspension of initial inorganic matter (2)

| Size of particles (μm) | Quantity of particles by volume (%) (1) | Quantity of particles by volume (%) (2) |
|---|---|---|
| <71 | 100 | 100 |
| <45 | 100 | 100 |
| <25 | 100 | 100 |
| <10 | 100 | 100 |
| <5 | 100 | 96 |
| <2 | 98 | 59 |
| <1 | 83 | 38 |
| <0.7 | 65 | 29 |
| <0.5 | 47 | 21 |
| <0.2 | 9 | 5 |
| <0.1 | 1 | 1 |

TABLE 3 bis value of the parameters $D_{50}$ (%) and $D_{90}$ (%) (diameter measurements for which respectively 50% and 90% by volume of the particles having a diameter of less than or equal to this value) for:
the self-binding pigmentary particles obtained using the process according to the invention (1)
the initial inorganic matter (2)

|  | 1 | 2 |
|---|---|---|
| $D_{50}$ (%) | 0.53 | 1.57 |
| $D_{90}$ (%) | 2.00 | 6.0 |

Tables 3 and 3 bis demonstrate a notable reduction of the particle sizes, in the case of the self-binding pigmentary particles obtained according to the invention, relative to the initial inorganic matter.

Example 4

This example concerns the process for preparing self-binding pigmentary particles in aqueous suspension from a mixture of talc and titanium dioxide and a solution of binders obtained by mixing starch and polyvinylic alcohol.

To accomplish this, the first stage a) of the process according to the invention consists in producing an aqueous suspension of talc having an average diameter of 13 μm and of titanium dioxide having an average diameter of less than 0.2 μm, by putting in suspension the talc and the titanium dioxide (in a 1:1 ratio by dry weight) in water at a dry matter weight content equal to 48%.

Stage b) of the process according to the invention is undertaken by diluting an aqueous suspension of polyvinylic alcohol Mowiol™ 4-88 sold by the company OMYA Peralta until a dry matter content by weight equal to 34% is reached, whilst stirring for 20 minutes, at a temperature of 90° C., and whilst preparing a solution of starch at a dry matter content by weight equal to 22%, whilst stirring for 20 minutes, at a temperature of 90° C.

Following this, the resulting suspension is co-ground with the same equipment as in example 1.

On conclusion of the grinding (30 minutes) a sample of the obtained suspension of self-binding pigmentary particles is removed in a flask. The granulometry of the suspension is measured using a MasterSizer™ S granulometer sold by the company MALVERN™ and is such that 28% of the particles have an average diameter of less than or equal to 1 μm.

The product thus obtained is an aqueous suspension of self-binding pigmentary particles having a dry matter by weight content of talc and titanium dioxide equal to 37%, an average particle diameter equal to 46 μm measured using a MasterSizer™ S granulometer sold by the company MALVERN™ and a talc and titanium dioxide/polymeric binders ratio equal to 100/10 by weight proportions.

The binding power of the said particles was measured by a crush test according to the method described in example 1, and is illustrated in FIG. 2. The latter shows that the process according to the invention enables self-binding pigmentary particles to be obtained in which the inter-particular cohesive forces between the mineral particles are much higher than in the case of the initial mineral matter.

Tables 4 and 4 bis indicate the granulometric distribution of the particles according to the invention, and of the initial mineral particles.

TABLE 4 granulometric distribution as measured using a MasterSizer ™ S granulometer sold by the company MALVERN ™ in the case of the suspension of self-binding pigmentary particles obtained using the process according to the invention (1), using a Sedigraph ™ 5100 sold by the company MICROMERITICS in the case of a suspension of initial inorganic matter (2)

| Size of particles (μm) | Quantity of particles by volume (%) (1) | Quantity of particles by volume (%) (2) |
|---|---|---|
| <71 | 100 | 99 |
| <45 | 97 | 91 |
| <25 | 86 | 70 |
| <10 | 54 | 41 |
| <5 | 37 | 32 |
| <2 | 29 | 27 |
| <1 | 28 | 25 |
| <0.7 | 27 | 23 |
| <0.5 | 24 | 20 |
| <0.2 | 5 | 6 |
| <0.1 |  | 1 |

TABLE 4 bis value of the parameters $D_{50}$ (%) and $D_{90}$ (%) (diameter measurements for which respectively 50% and 90% by volume of the particles having a diameter of less than or equal to this value) for:
the self-binding pigmentary particles obtained using the process according to the invention (1)
the initial inorganic matter (2)

|  | 1 | 2 |
|---|---|---|
| $D_{50}$ (%) | 8.9 | 14.3 |
| $D_{90}$ (%) | 9.0 | 15.0 |

Tables 4 and 4 bis demonstrate a notable reduction of the particle sizes, in the case of the self-binding pigmentary particles obtained according to the invention, relative to the initial inorganic matter.

Example 5

This example illustrates a variant of the process of preparation according to the invention for pigmentary self-linking particles in aqueous suspension from marble and from two binding agents in suspension.

To do this, we produce with the same material and the same operating conditions as in example 1, the aqueous suspension of self-binding pigmentary particles from example 1, having a content in weight of dry material of calcium carbonate equal to 20%, an average particle diameter of 0.50 μm as measured by a MasterSizer™ S, and a marble/Acronal™ S728/Polygen™ WE4 equal to 100/9, 5/0, 5 in parts in dry material weight.

Once this aqueous suspension of self-binding pigmentary particles is obtained, it is put in a Rouan YXY centrifuge rotating at 5,500 rpm so as to increase its dry material concentration.

After 6 minutes in the centrifuge, the resulting aqueous suspension has 58% dry material content.

Once obtained, this concentrated aqueous suspension of self-binding pigmentary particles is dispersed using a Pendraulik™ agitator at 300 rpm and adding 0.5% dry weight of the dry weight of pigmentary particles of a wetting agent, styrene copolymer/butyl acrylate/methacrylic acid/acrylic acid and 0.1% dry weight of the dry weight of pigmentary particles of a dispersing agent, acrylic acid copolymer/maleic anhydride, then the quantity of water needed to obtain a 55% concentration of dry material.

The resulting Brookfield™ viscosity figure is 106 mPa·s at 100 rpm.

Example 6

This example again illustrates another variant of the process according to the invention.

To do this, we produce with the same material and the same operating conditions as in example 1, the aqueous suspension of self-binding pigmentary particles from example 1, having a content in weight of dry material of calcium carbonate equal to 20%, an average particle diameter of 0.50 μm as measured by a MasterSizer™ S, and a marble/Acronal™ S728/Polygen™ WE4 equal to 100/9, 5/0, 5 in parts in dry material weight.

Once obtained this suspension of self-binding pigmentary particles, a filter press is used to raise the suspension's dry material concentration up to 65.4%.

Once obtained this concentrated aqueous suspension of self-binding pigmentary particles, we disperse it using a Pendraulik™ agitator at an even speed of 3,000 rpm and consecutively adding 0.17% in dry weight of the Tamol™ NN9104 wetting agent and 0.59% in dry weight of the Coatex P70 dispersing agent, in dry weight terms of pigmentary particles.

After 14 days storage the Brookfield™ viscosity index is 1630 mPa·s at 100 rpm.

The invention claimed is:

1. A process for the preparation of an aqueous suspension of self-binding pigmentary particles comprising the following stages:
   a) forming one or more aqueous suspensions of at least one inorganic matter comprising calcium carbonate;
   b) forming or obtaining one or more aqueous solutions or suspensions or emulsions of at least one binder selected from the group consisting of (i) semi-crystalline latexes, (ii) latexes in emulsion or solutions of soluble binders selected from polyvinylic alcohol, polyvinyl acetate, starch, casein, proteins, carboxymethyl cellulose (CMC), ethyl hydroxyethyl cellulose (EHEC), or their mixtures, and (iii) emulsions of polyethylene waxes or copolymers in their neutralized form of polyethylene with other monomer units or other monomers or their mixtures; and c) co-grinding the aqueous suspension or suspensions obtained in stage a) with the aqueous solutions or suspensions or emulsions obtained in stage b) in a mill so as to obtain an aqueous suspension of self-binding pigmentary particles comprising the inorganic matter and the binder adsorbed on the surface of the inorganic matter, wherein the aqueous suspension of self-binding pigmentary particles comprises at least 5% by weight of the at least one binder, and wherein the average particle diameter of the self-binding pigmentary particles so obtained is less than the average particle diameter of the inorganic matter from stage a).

2. The process according to claim 1, which further comprises the step of co-grinding the aqueous suspension obtained in stage c) with a second one or more aqueous solutions or suspensions or emulsions of at least one binder to obtain a second aqueous suspension of self-binding pigmentary particles.

3. The process according to claim 2, wherein the second aqueous suspension is subjected to drying.

4. The process according to claim 2, which further comprises the step of increasing the concentration of the second aqueous suspension by thermal or mechanical concentration.

5. The process according to claim 4, wherein the second aqueous suspension is dispersed with at least one dispersing agent and/or wetting agent.

6. The process according to claim 1, wherein the aqueous suspension obtained in stage c) is subjected to drying.

7. The process according to claim 6, wherein the self-binding pigmentary particles after drying contain from 70% to 95% by weight of at least one inorganic matter and from 5% to 30% by weight of at least one binder.

8. The process according to claim 6, wherein the self-binding pigmentary particles after drying contain from 85% to 95% by weight of at least one inorganic matter and from 5% to 15% by weight of at least one binder.

9. The process according to claim 6, wherein the average diameter of the self-binding pigmentary particles after drying is between 5 μm and 100 μm.

10. The process according to claim 6, wherein the average diameter of the self-binding pigmentary particles after drying is between 10 μm and 30 μm.

11. The process according to claim 1, wherein the aqueous suspension or suspensions of inorganic matter formed in stage a) contain from 1% to 80% by dry weight of inorganic matter.

12. The process according to claim 1, wherein the aqueous suspension or suspensions of inorganic matter formed in stage a) contain from 15% to 60% by dry weight of inorganic matter.

13. The process according to claim 1, wherein the inorganic matter in stage a) comprises calcium carbonate in admixture with one or more of metallic oxides, hydroxides, sulphites, silicates, dolomites, kaolin, talc, gypsum, titanium dioxide, satin white, and aluminium trihydroxide.

14. The process according to claim 1, wherein the inorganic matter consists essentially of calcium carbonate.

15. The process according to claim 14, wherein the inorganic matter is calcium carbonate in the natural form or in the precipitated form or their mixtures.

16. The process according to claim 14, wherein the inorganic matter is a natural calcium carbonate chosen from among chalk, marble, calcite, or their mixtures.

17. The process according to claim 1, wherein the aqueous solutions or suspensions or emulsions of at least one binder formed in stage b) contain from 5% to 50% by weight of at least one binder.

18. The process according to claim 1, wherein the aqueous solutions or suspensions or emulsions of at least one binder formed in stage b) contain from 5% to 20% by weight of at least one binder.

19. The process according to claim 1, wherein the binder or binders of stage b) is chosen from among semi-crystalline latexes, or solutions of soluble binders.

20. The process according to claim 19, wherein the semi-crystalline latexes are chosen from among emulsions of polyethylene waxes or copolymers in their neutralized form of polyethylene with other monomer units or other monomers or their mixtures.

21. The process according to claim 20, wherein the monomer units are acrylic acid.

22. The process according to claim 1, wherein the binder or binders of stage b) is chosen from among latexes in emulsion or solutions of soluble binders selected from polyvinylic alcohol, polyvinyl acetate, starch, casein, proteins, carboxymethyl cellulose (CMC), ethyl hydroxyethyl cellulose (EHEC), or their mixtures.

23. The process according to claim 1, wherein the ratio of inorganic matter and binders is between 70 and 30 expressed as weight proportions.

24. The process according to claim 1, wherein the self-binding pigmentary particles obtained in step c) have an average particle diameter of between 0.1 μm and 10 μm.

25. The process according to claim 1, wherein the self-binding pigmentary particles obtained in step c) have an average particle diameter of between 0.1 μm and 2 μm.

26. The process according to claim 1, which further comprises the step of increasing the concentration of the aqueous suspension obtained in stage c) by thermal or mechanical concentration.

27. The process according to claim 26, wherein the aqueous suspension is dispersed with at least one dispersing agent and/or wetting agent.

28. The process according to claim 1, wherein the aqueous suspension obtained in step c) is dispersed with at least one dispersing agent and/or wetting agent.

29. The process according to claim 28, wherein the dispersing agent is chosen from among polymers and/or acrylic or vinylic or allylic copolymers, homopolymers or copolymers in their totally acidic or partially or totally neutralised forms by neutralising agents containing monovalent or polyvalent cations or amines or their mixtures, from at least one of the monomers including acrylic and/or methacrylic, itaconic, crotonic, fumaric acids, maleic anhydride or isocrotonic, aconitic, mesaconic, sinapic, undecylenic acid, angelic acid and/or their respective esters including acrylates or methacrylates of alkyl, aryl, alkylaryl, arylalkyl, ethyl acrylate, butyl acrylate, methyl methacrylate, sofonic acrylamido methyl propane acid, acrylamide and/or methacrylamide, carylate phosphate of glycol ethylene, methacrylate phosphate of glycol ethylene, acrylate phosphate of glycol propylene, methacrylate phosphate of glycol propylene, chlorine or ammonium trimethyl propyl methacrylamid sulphate, as well as their acrylate and acrylamide equivalents, quaternised or not, and/or dimethyldiallyl chlorate, vinylpyrrolidone, vinylcaprolactame, diisobutylene, vinyl acetate, styrene, alpha-methyl-styrene, styrene sodium sulfonate, vinylmethylether, allylamine or chosen from at least one of the monomers or their mixtures, polymerised in the presence of at least one mineral material.

30. The process according to claim 28, wherein from 0.01% to 2% by weight of at least one dispersing agent is added.

31. The process according to claim 28, wherein from 0.01% to 5% by weight of at least one wetting agent is added.

\* \* \* \* \*